US 6,615,770 B2

(12) United States Patent
Patterson et al.

(10) Patent No.: US 6,615,770 B2
(45) Date of Patent: Sep. 9, 2003

(54) METHOD AND APPARATUS TO CONTROL ANIMAL BEHAVIOR

(75) Inventors: Jesse F. Patterson, San Rafael, CA (US); Tristan M. Christianson, San Francisco, CA (US); Edward C. McKinney, Jr., San Rafael, CA (US); Andrew J. Parker, Sausalito, CA (US)

(73) Assignee: Sharper Image Corporation, San Francisco, CA (US)

( * ) Notice: Subject to any disclaimer, the term of this patent is extended or adjusted under 35 U.S.C. 154(b) by 0 days.

(21) Appl. No.: 09/884,825

(22) Filed: Jun. 19, 2001

(65) Prior Publication Data

US 2002/0189551 A1 Dec. 19, 2002

(51) Int. Cl.[7] .............................................. A01K 29/00
(52) U.S. Cl. ...................... 119/719; 340/573.1; 119/721
(58) Field of Search ................................ 119/719, 720, 119/721, 712, 174; 340/573.1, 573.2, 573.3, 384.2, 384.3, 384.4

(56) References Cited

U.S. PATENT DOCUMENTS

| | | | | |
|---|---|---|---|---|
| 4,475,102 A | * | 10/1984 | Troy et al. ................ | 116/22 A |
| 4,876,674 A | * | 10/1989 | Parmely et al. ........... | 116/22 A |
| 4,965,552 A | * | 10/1990 | Price et al. ................ | 340/566 |
| 4,996,521 A | * | 2/1991 | Hollow ...................... | 340/691 |
| 5,009,192 A | * | 4/1991 | Burman ..................... | 119/719 |
| 5,207,179 A | * | 5/1993 | Arthur et al. .............. | 119/721 |
| 5,214,411 A | * | 5/1993 | Herbruck .................... | 119/174 |
| 5,307,763 A | * | 5/1994 | Arthur et al. .............. | 119/718 |
| 5,450,063 A | * | 9/1995 | Peterson et al. ........... | 119/713 |
| 5,460,124 A | * | 10/1995 | Grimsley et al. .......... | 119/721 |
| 5,570,655 A | * | 11/1996 | Targa ........................ | 119/51.02 |
| 5,603,287 A | * | 2/1997 | Houck ....................... | 119/719 |
| 5,870,972 A | * | 2/1999 | Zinter et al. ............... | 119/719 |
| 5,892,446 A | * | 4/1999 | Reich ........................ | 119/720 |
| 5,966,075 A | * | 10/1999 | Blanks ....................... | 119/712 |
| 5,969,593 A | * | 10/1999 | Will ........................... | 119/174 |
| 5,977,866 A | * | 11/1999 | Joseph et al. ............. | 116/22 A |
| 5,986,551 A | * | 11/1999 | Pueyo et al. .............. | 119/713 |
| 6,016,100 A | * | 1/2000 | Boyd et al. ................ | 119/712 |
| 6,058,889 A | * | 5/2000 | Van Curen et al. ........ | 119/718 |
| 6,094,141 A | * | 7/2000 | Tsai ........................ | 340/573.1 |
| 6,191,693 B1 | * | 2/2001 | Sangsingkeow ........... | 119/720 |
| 6,232,880 B1 | * | 5/2001 | Anderson et al. .......... | 119/421 |
| 6,250,255 B1 | * | 6/2001 | Lenhardt et al. ........... | 119/713 |
| 6,285,630 B1 | * | 9/2001 | Jan ........................... | 116/22 A |
| 6,396,402 B1 | * | 5/2002 | Berger et al. ............. | 119/713 |
| 6,407,670 B1 | * | 6/2002 | Dysarsz et al. ............ | 116/229 |
| 2002/0050249 A1 | * | 5/2002 | Grimsley et al. .......... | 119/721 |

FOREIGN PATENT DOCUMENTS

| | | | |
|---|---|---|---|
| EP | 0265182 | * | 4/1988 |
| WO | WO-90/01758 | * | 2/1990 |

OTHER PUBLICATIONS

The Sharper Image Apr. 2001 Catalogue, Item No. 14335 Sofa Scram, p. 41.
Webpage download from "skymall.com" website for "Pet Trainer Alarm" product, Item #6740SOL; downloaded Jun. 15, 2001.

* cited by examiner

*Primary Examiner*—Yvonne Abbott
(74) *Attorney, Agent, or Firm*—Fliesler Dubb Meyer & Lovejoy LLP (57) ABSTRACT

An electronic device detects the presence of an animal such as a pet in a protected area and outputs a deterrent signal that preferably includes the voice of the pet's owner admonishing the animal. The animal is detected by sensing at least one of sound, heat, vibration, and motion. The deterrent signal may include loud noises, and signals audible to the animal but not to humans. The deterrent signal may also include bursts of light. The device can vary the nature and quality of the deterrent signal if the animal remains near the protected area for a predetermined time.

12 Claims, 5 Drawing Sheets

METHOD AND APPARATUS TO CONTROL ANIMAL BEHAVIOR

FIELD OF THE INVENTION

This invention relates to devices that attempt to deter animals including household pets from being in certain areas. For example, on furniture, near the garbage can, and so forth. More specifically, the device can affirmatively help train or at least control the animal to avoid such areas.

BACKGROUND OF THE INVENTION

As any pet owner can attest, given a choice, a household pet will sooner or later attempt to sleep on sofas, chairs, beds, and other furniture that the owner would prefer be reserved for human use. Often the pet will attempt to find food in the garbage can. If the pet's behavior can be corrected while occupying the forbidden area, a measure of training can be imparted. But often pets go onto the forbidden area when the owner is not around, and thus the behavior goes uncorrected.

Thus, there is a need for a device that can automatically and consistently deter such animal behavior, and that can provide affirmative feedback to help train a pet. Preferably the affirmative feedback should include correction in the pet owner's voice. humans are not around. For example, in the middle of the night, there is a need for a device that can also deter such scavengers from remaining in protected regions where garbage cans may be stored.

The present invention provides such a device.

SUMMARY OF THE INVENTION

The present invention provides an electronic device that detects the presence of an animal in a region to be protected, and outputs a deterrent signal to startle or frighten and thus deter the animal from remaining in that region. The protected region maybe an indoor area such as a room, a piece of furniture or a bed. In this case, the animal is probably a household pet. Alternatively, the protected region may be outdoors, e.g., a garbage can storage area, in which case the animal may be a household pet, or a scavenger such as a racoon, skunk or deer. The deterrent signal may include audible and/or inaudible sounds including audible sounds recorded in the voice of a pet owner, and/or light bursts.

In one embodiment, the device is placed on the protected region itself, e.g., a sofa, a chair, a bed, etc. and includes a sensor that detects at least one of motion, vibrations, noise, and infrared body heat to determine when an animal (or other object) is attempting to enter the protected region. Circuitry within the invention processes sensor output signal(s) to discern between true and false sensing. True sensor output signal(s) are coupled to a deterrent signal emitter. Without limitation, the deterrent signal may include noises including sounds at frequencies unpleasant to the ears of dogs or cats (or other animals to be deterred). Preferably the deterrent signal also includes the pet owner's recorded voice admonishing the pet, e.g., "No! Bad dog, Rover, Bad dog." As such the device preferably includes a recorder unit enabling the pet owner to record several seconds of his or her voice admonishing the pet. The emitted deterrent signal may also include bursts of emitted light, intended to startle or frighten away the animal. A timer circuit within the device can be used to turn the device off during certain hours, if desired, and to determinate the deterrent output signal after a predetermined time duration.

In another embodiment, the device is not disposed on the protected region itself but may be located several meters or more away such that the sensor is responsive to intrusions into an area including the protected area. As such, the device may be mounted on a wall or ceiling in the room adjacent the area to be protected. When the sensor detects presence of an animal (or other object) a deterrent signal is output, as described above.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
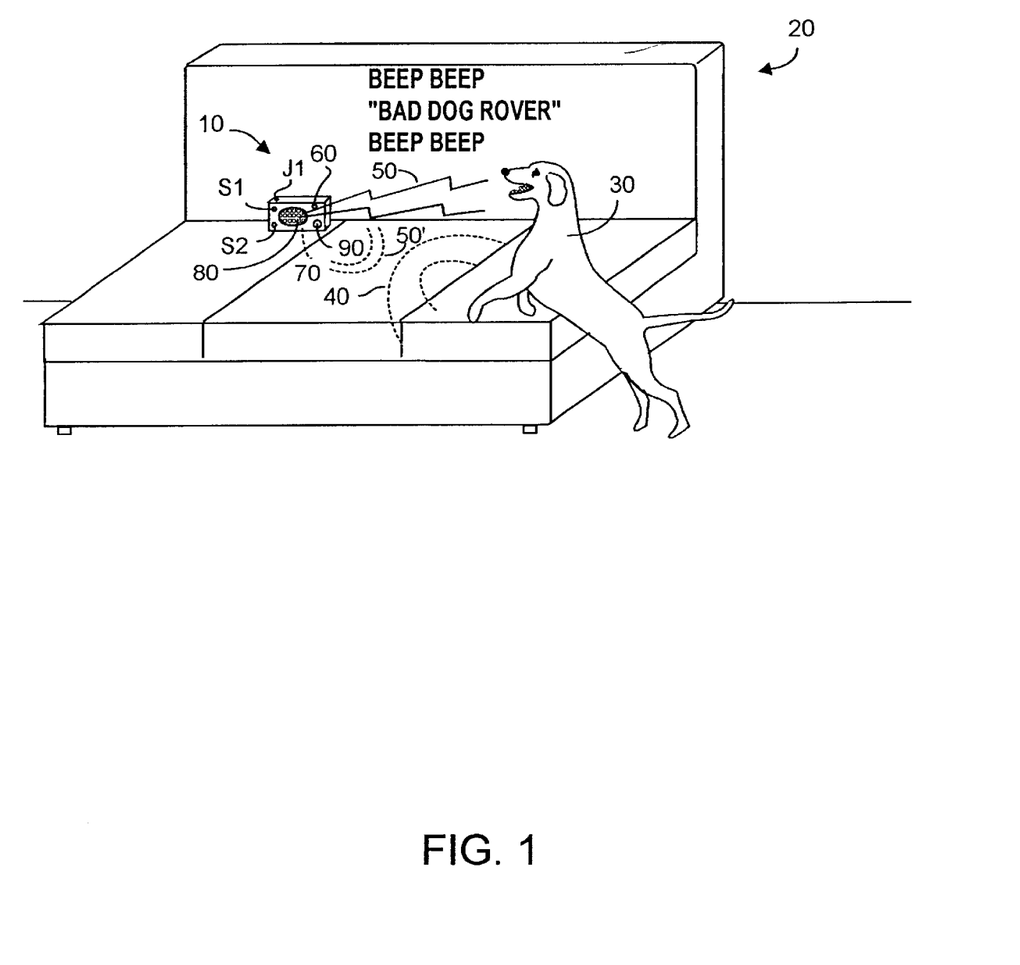
FIG. 1 depicts a first embodiment in which the present invention maybe disposed on an object to be protected.

FIG. 1 depicts a device 10, according to the present invention, disposed on an area 20 to be protected from the animal 30 climbing onto or being on the protected area 20. In FIG. 1 the protected area 20 is depicted as a sofa. However, one of ordinary skill in the art will appreciate that area 20 could be other furniture, such as, but not limited to, a bed, a container such as a garbage can, a carpet, or indeed a room or portion of a room or other area.

As will be described, device 10 maybe used to help train an animal 30, especially a household pet, from entering onto or into the protected area 20, and thus deter undesired animal behavior. Device 10 is intended to sense, from animal emanations 40 when an intrusion into the protected area 20 is occurring. When the animal 30 is detected the device 10 will activate at least one output deterrent signal 50 to frighten the misbehaving animal 30 away from the area 20. The output deterrent signal 50 may include acoustic sounds including enunciated messages in the voice of the owner. Additionally, the signal 50 may also include sounds inaudible to humans but audible to the animal 30. For example, audio signals having frequencies components greater than about 17 k KHz can be inaudible to humans, yet audible to animals. The output deterrent signal 50 may alternatively, or in addition, include bursts of light.

Since device 10 can remain operative at all times, if desired, the misbehaving animal 30 will receive a deterrent signal 50 each time the animal 30 enters the protected area 20. Thus, the animal's behavior can be modified or trained, even if the animal owner is absent. The resultant reinforcement by device 10 of a behavior correcting message whenever the protected area 20 is violated can result in a behavioral change in the animal 30.

In the embodiment of FIG. 1, the presence of animal 30 on or adjacent to the protected area 20 is detected by one or more sensors 60 that respond to one or more manifestations 40 from the animal 30. Manifestations 40 that can be detected by the sensor 60 may include, without limitation, motion of the animal 30, vibrations upon the area 20 resulting from the animal 30, and heat and/or sound emitted by the animal 30. Note that such manifestations 40 are essentially passive in that it is not required that the animal 30 be equipped with a radio signal-emitting collar or other such active unit that emits a signal to be detected by sensor 60.

As described later in more detail with respect to FIG. 4, within device 10, output signal(s) from sensor(s) 60 are processed by circuitry 70 that cause the device 10 to emit one or more deterrent signals 50, 50'. For example, the signal 50 maybe acoustic waves (audible and/or inaudible to humans) emitted by the transducer 80. In addition or as an alternative, the deterrent signal 50' may include bursts of light transmitted by emitter 90. Upon hearing or otherwise sensing signal 50 and/or 50', the animal 30 will exit protected area 20. If the animal 30 subsequently reenters the area 20, the signals 50 and/or 50' will again be emitted by the device 10, and eventually the animal 30 will be trained to avoid the area 20.

Figure 2:
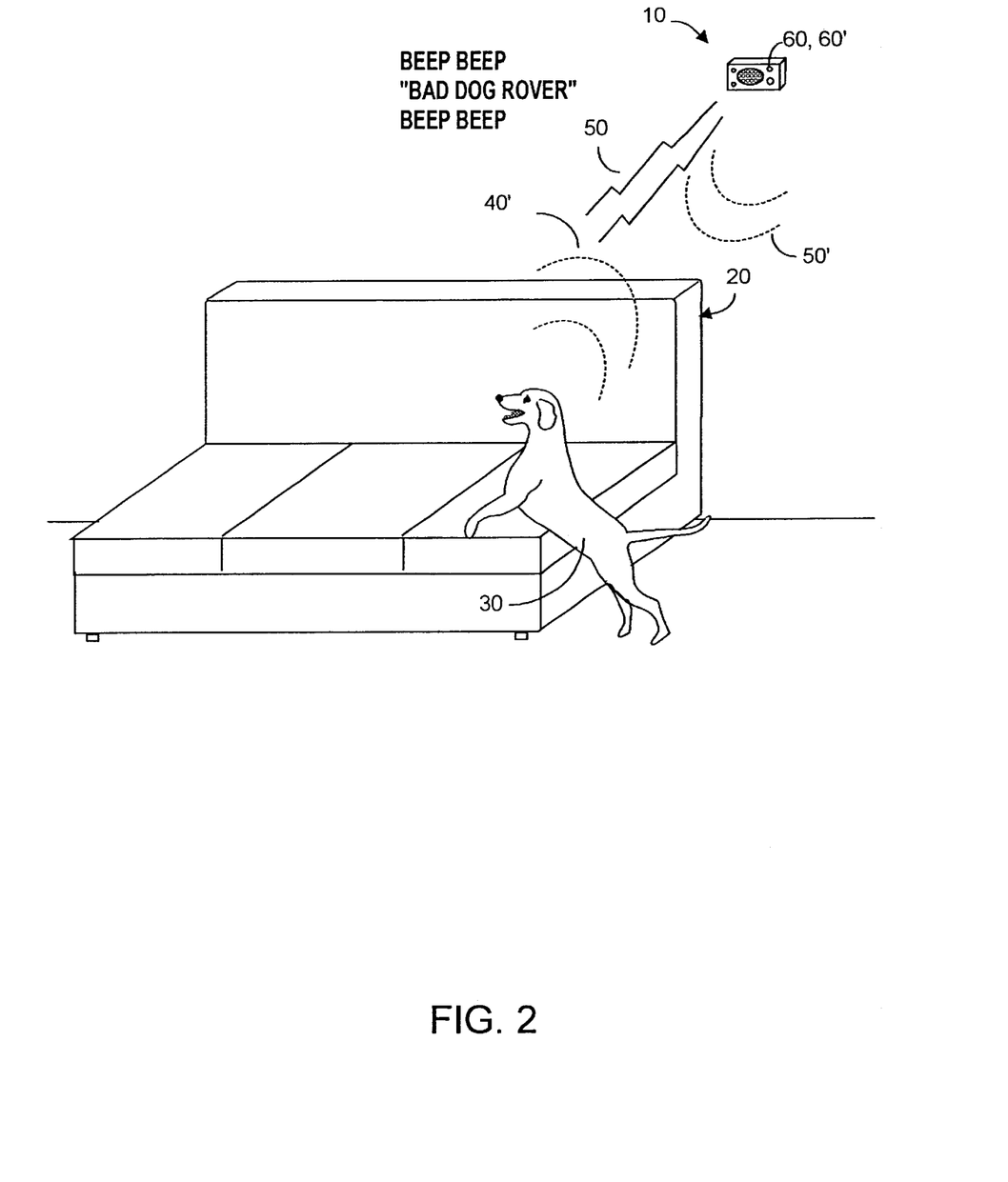
FIG. 2 depicts a second embodiment in which the present invention maybe disposed remotely from an object to be protected.

In the embodiment of FIG. 2, the device 10 is not disposed on the area 20 to be protected. Instead, the device 10 is disposed adjacent to or in the vicinity of the area 20. For example, the device 10 maybe mounted on a wall or ceiling in a room containing the protected area 20. In this embodiment, a preferably passive infrared (PIR) sensor 60' detects heat and/or motion from the animal 30 when the animal 30 comes within the sensing range of the sensor 60'. When the pet 30 or other object comes near or onto the sofa 20, the device 10 emits at least one deterrent signal 50, 50'.

Figure 3:
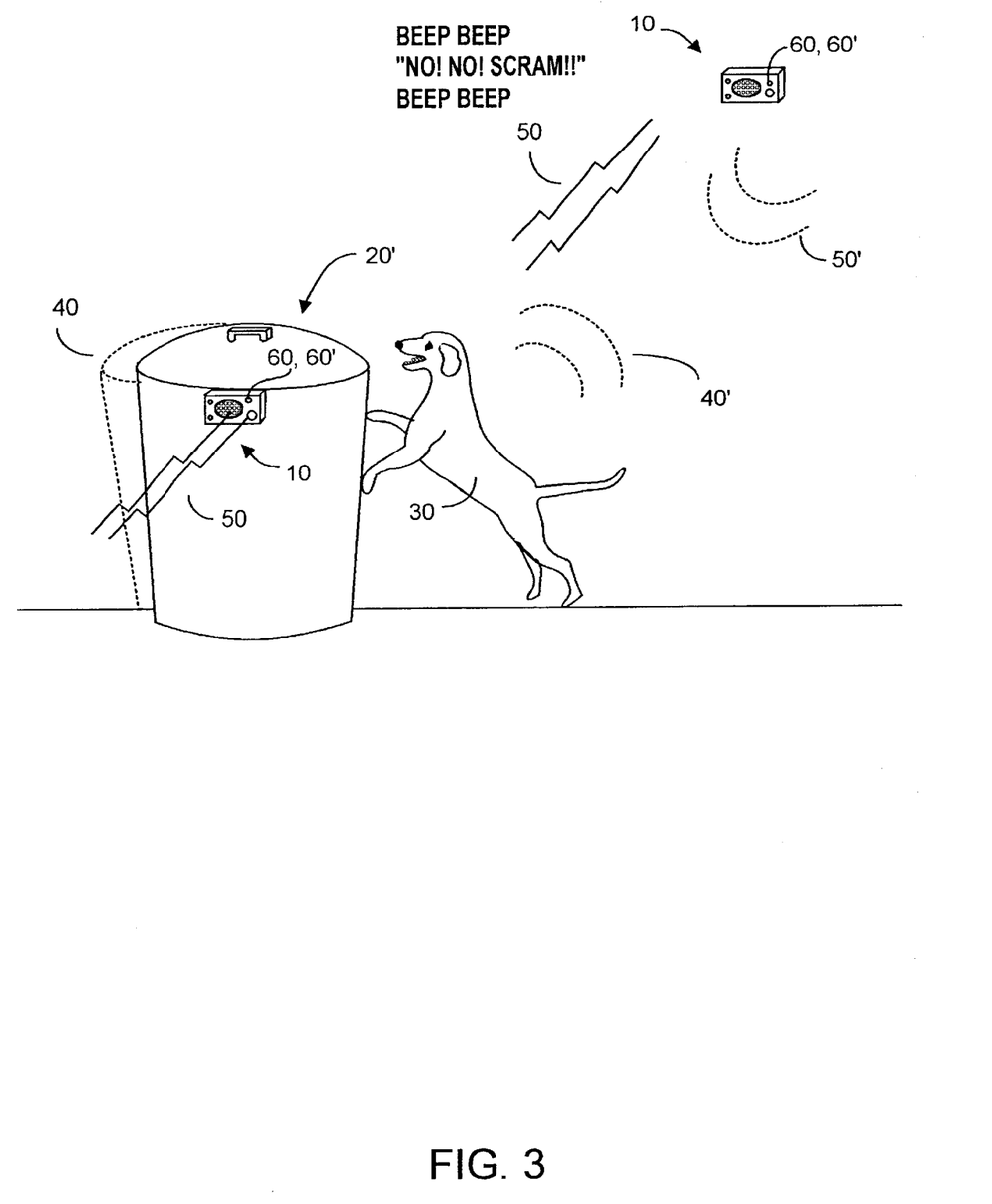
FIG. 3 depicts either embodiment of the present invention used to protect an outside area.

Referring now to FIG. 3, the device 10 maybe used to protect areas outside the house. For example, the device 10 can be used to protect a garbage can 20' perhaps adjacent a house or garage. As shown in FIG. 3, the device 10 may be located directly on the garbage can 20'. When the animal 30 comes within the sensing range of the sensors 60, 60', a deterrent signal is emitted. The sensors 60, 60' can detect vibration of the can 20' caused by the animal, as well as heat, motion, or noise emanating directly from the animal 30. When the animal's presence is sensed, the device 10 will emit a deterrent signal such as a sound 50 (audible or inaudible to humans), and/or light bursts 50'. The deterrent signals will frighten off wildlife such as raccoons, skunks, deer, as well as domestic pets.

Figure 4:
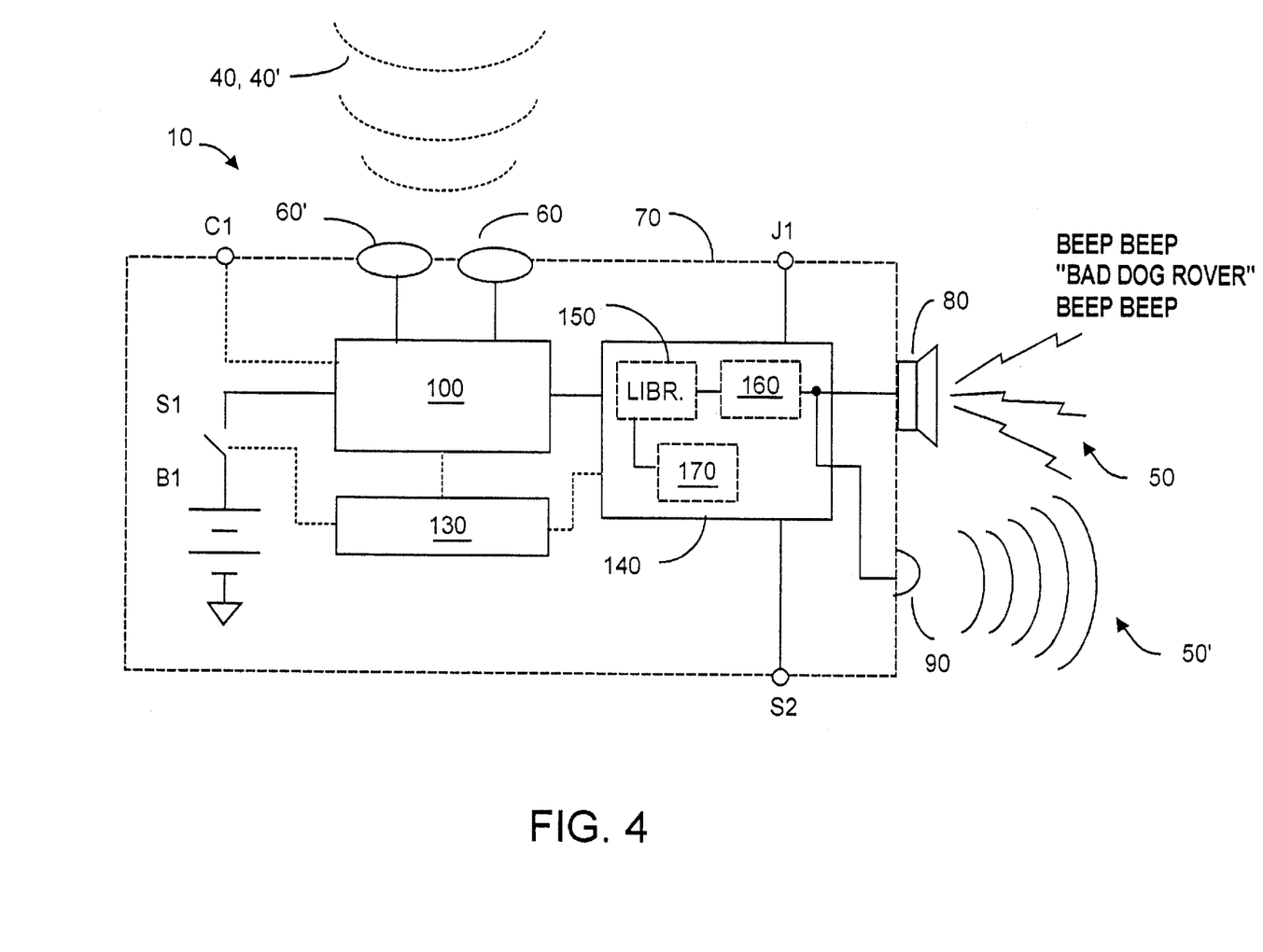
FIG. 4 is a block diagram of a preferred embodiment of the present invention.

FIG. 4 is a block diagram of a preferred implementation of the circuitry 70. Preferably, the device 10 which receives operating power from an internal DC power source such as batteries B1, via an on/off switch S1, which may in fact be a solid state switch. Of course an external AC:DC power source could be used instead of or in addition to batteries B1.

The sensors 60, 60' detect emanations 40, 40', such as noise or heat from the animal 30. Interface circuit 100 provides any required impedance matching, signal conditioning, and so forth such that signal(s) from the sensor(s) maybe used by the circuitry 70. The circuit 100 preferably also provides discrimination against false triggering from pseudo or false signals. For example, when detecting animal-produced vibratory signals 40, there may be a minimum repetition rate that will be encountered. Incoming signals with an apparent repetition rate of say 100 KHz may be too high, and can be rejected as being pseudo-signals. One or more user-adjustable controls, shown as C1, maybe provided to permit a user to adjust threshold levels and/or frequency cut-off levels for circuitry associated with rejection of false-triggering. Once the device 10 is set in a given environment it should not ordinarily be necessary to readjust any deviations from factory settings to such threshold levels and frequency cut-off levels.

Output signals from the circuitry 100 are coupled to the deterrent signal generator system 120, to cause the appropriate deterrent signals 50 and/or 50' to be generated from appropriate transducer(s) 80, 90. For example, the transducer 80 maybe a sound transducer that can emit acoustic waves 50, including frequencies inaudible to humans and/or human audible frequencies. In a preferred embodiment, the deterrent signal 50 includes human speech reprimanding the animal. The speech is previously recorded and stored in the device 10 in the voice of the owner of the animal. Alternatively or additionally, deterrent signals can include bursts of light 50' emitted by an appropriate light emitter system 90 such as an LED.

Before describing the deterrent signal generator system 120, it is noted that the circuitry 70 preferably includes an environmental detector system 130 that can determine whether to provide operating power to all of the circuit 70, and if so, whether to output all possible deterrent signals. For example, the system 130 can include a clock timer and/or an ambient light detector to discern whether it is presently day or night. If it is night and if the system 10 is disposed out doors, the system 130 will recognize that sounds 50 that are audible to humans should not be emitted by transducer 80 because such sounds 50 might wake up the entire neighborhood. On the other hand, if the system 130 determines that the present time is earlier than say 8:00 PM, such sounds 50 maybe emitted if an animal 30 is detected by the device 10. By the same token, if the system 130 determines it is now daytime, it is undesirable to emit bursts of light 50' from the emitter 90. The light 50' is relatively ineffective in bright ambient light and will needlessly dissipate energy from the batteries B1. However, the circuitry 100 could countermand the circuit 130 if an initial emission of the sound-only deterrent 50 fails to deter the animal, as evidenced by continued incoming true emanations 40, 40' from the animal 30. Such intelligence enables the device 10 to operate not only more effectively, but also more efficiently from a power consumption standpoint.

The circuit 130 can also cause most of the circuitry 70 to enter a sleep mode in which power from the battery B1 is conserved. In this mode, the sensors 60, 60' will remain active, but the remainder of the circuitry 70 can be powered down until an intrusion signal from the sensors is detected. Once an emanation 40, 40' from the animal 30 is detected, the circuit 130 will activate more or all of the circuitry 70, where upon normal operation of the device 10 occurs. However, after emission of deterrent signal(s) 50, 50', if no further emanation(s) are detected from animal(s) or other objects, the circuit 130 can be permitted to again power down the device 10.

As shown in FIG. 4, the system 120 preferably includes a deterrents signal generator system 140 that includes a library 150 of stored deterrent signals including signals, that when processed by the circuitry 160 and output by the transducer 80, are audible to humans and/or to animals. Most of the repertoire of sound effects stored in the library 150 maybe stored in read-only-memory and will be selected to startle or frighten off animals when output by the transducer 80 as deterrent signals 50. Preferably a portion of the library 150 provides user-writable memory such that a recorder 170 enables a human to record admonishments to pets. For example, "Bad dog, Rover", etc. allows a pet owner to record admonishments into the library 150 for future playback as deterrent signal(s) 50. An audio input jack J1 maybe included in the system 70 and/or a microphone may be built-in. In any event, it is preferred that at least one owner-recorded admonishment or deterrent command signal be made and stored in the library 150. It is believed that an animal being admonished in the voice of its owner will react more seriously to the deterrent signal than if the voice were that of a stranger, or if the deterrent signal were not vocalized by a human.

Of course the library 150 can also record or store different patterns of sounds such as beeps, sirens, and crashing noises. In addition, the library 150 can include stored command patterns that can command the signal processor 160 to cause the emitter 90 to emit bursts of light 50'. The light intensity, wavelength, and duration is selected to startle and frighten rather than injure the detected animal(s).

As noted, feedback-type control preferably is implemented with the circuit 130 such that if a given admonishment does not stop the animal 30 from entering the protected area 30, a subsequent signal can emitted. For example, if the sensors 60, 60' determine that animal 30 is still present, the same admonishment but with louder volume, and/or a more severe admonishment can be output by the transducers 80 and/or 90. Additionally, the device 10 may have, a user-operable master volume control S2. If the device 10 is deployed out doors, more audio volume may be required than if device 10 were deployed in a small room in a home.

Figure 5A:
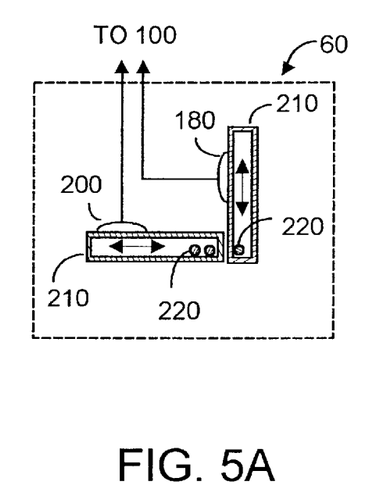
FIGS. 5A–5D depict exemplary sensor units, according to the present invention.

FIGS. 5A–5D depict exemplary sensors 60 according to the present invention. In FIG. 5A, the sensor 60 comprises at least one sound detector 200 attached to a capsule 210 containing at least one movable BB-like object 220. Preferably two such capsules 210 are provided, and are oriented at right angles such that movement of the sensor 60 will result in movement of the BB's 220 within at least one of the capsules 210. Referring to FIG. 1 and FIG. 3, such movement of the sensor 60 results when the animal 30 causes the protected area 20 to vibrate. The vibrations move the BB's 220, which generate noise detected by the sound detector 200, and coupled to the circuit 100.

Figure 5B:
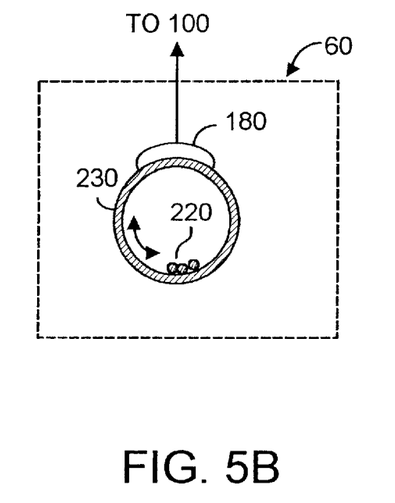

In FIG. 5B, the BB's 220 in the sensor 60 are contained within a sphere-shaped housing 230. The BB's 220 move freely within the housing 230 as the sensor 60 is moved or otherwise vibrated by the animal 30 (or other object). Such movement of the BB's 220 within the housing produces noise that is detected by the sound detector 180 and coupled to the circuit 100.

Figure 5C:
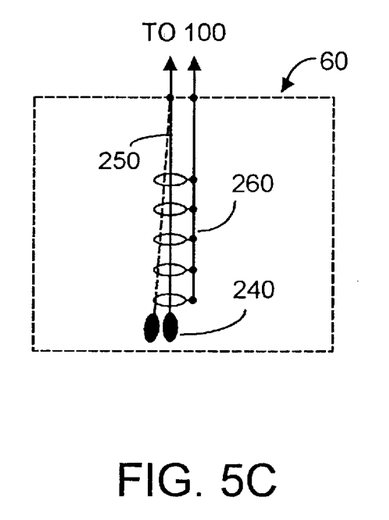

Yet another form of the sensor 60 is shown in FIG. 5C in which a weight 240 is connected to a rod or wire 250 the combination of the weight 240 and the wire 250 act as a pendulum contained within electrically conductive rings coupled to a conductor 260. In a non-vibratory state, there is no electrical connection between the rod or wire 250 and conductor 260. But, if the sensor 60 is vibrated or otherwise moved, at least intermittent electrical connection will occur as weight 240 causes rod or wire 250 to touch and make electrical contact with at least one ring coupled to the conductor 260. The resultant intermittent contact is readily sensed by the circuit 100 and can be recognized as presence of an animal 30 or other object. As noted previously, false triggering can be electronically rejected by the circuitry 100.

Figure 5D:
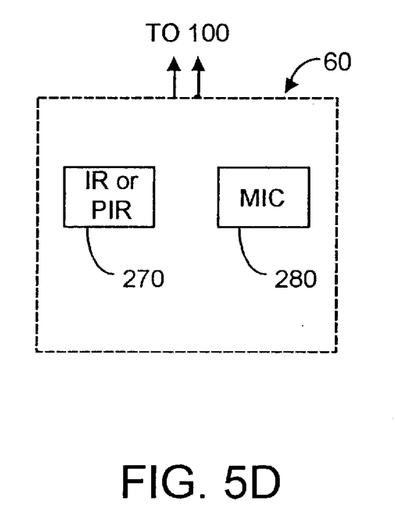

The sensor configurations of FIGS. 5A–5C are especially useful when the device 10, or at least the sensor 60, is disposed on the region to be protected. However in the system shown in FIGS. 2–3 the device 10 maybe disposed remotely from the object to be protected. In such an application, it is preferred that the sensor 60 include at least one of an infrared (IR) sensor, preferably a passive IR (PIR) sensor, a motion sensor, or sound sensor. Such sensor configurations are shown in FIG. 5D in which the sensor 60 includes at least one of an IR and/or PIR sensor 270 and/or a sound sensor 280 such as a microphone or other transducer. It is understood that an IR and/or PIR sensor 270 can respond not merely to heat generated by an animal 230, but also to motion of the animal 230, within the range of sensor detection.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system to deter an animal from entering or remaining in an area, comprising:
   at least one sensor adapted to be placed in the area for sensing the close proximity of the animal to the area;
   a deterrent signal generator to receive an output from the at least one sensor, the deterrent signal generator capable of storing at least one deterrent signal selected from a group consisting of (i) a message recorded in a human voice admonishing the animal, and (ii) a sound likely to startle the animal;
   a deterrent signal output transducer to receive an output from the deterrent signal generator to generate the at least one deterrent signal; and
   a circuit having an input coupled with the at least one sensor and having an output coupled to the deterrent signal generator, the circuit can detect the effectiveness of the deterrent signal and can selectively cause the deterrent signal generator to output another the deterrent signal differing from the deterrent signal first generated by the deterrent signal generator;
   wherein the deterrent signal generator further is capable of storing a pulse signal;
   wherein the pulse signal emitted by the deterrent signal output transducer is a burst of light to startle the animal.

2. A system to deter an animal from entering or remaining in an area, comprising:
   at least one sensor adapted to be placed in the area for sensing the close proximity of the animal to the area;
   a deterrent signal generator to receive an output from the at least one sensor, the deterrent signal generator capable of storing at least one deterrent signal selected from a group consisting of (i) a message recorded in a human voice admonishing the animal, and (ii) a sound likely to startle the animal;
   a deterrent signal output transducer to receive an output from the deterrent signal generator to generate the at least one deterrent signal; and
   a circuit having an input coupled with the at least one sensor and having an output coupled to the deterrent signal generator, the circuit can detect the effectiveness of the deterrent signal and can selectively cause the deterrent signal generator to output another the deterrent signal differing from the deterrent signal first generated by the deterrent signal generator;
   wherein the sensor detects infrared emitted by the animal.

3. The system of claim 2, wherein the sensor is a passive infrared sensor.

4. A system to deter an animal from entering or remaining in an area, comprising:
   at least one sensor adapted to be placed in the area for sensing the close proximity of the animal to the area;
   a deterrent signal generator to receive an output from the at least one sensor, the deterrent signal generator capable of storing at least one deterrent signal selected from a group consisting of (i) a message recorded in a human voice admonishing the animal, and (ii) a sound likely to startle the animal;
   a deterrent signal output transducer to receive an output from the deterrent signal generator to generate the at least one deterrent signal; and
   a circuit having an input coupled with the at least one sensor and having an output coupled to the deterrent signal generator, the circuit can detect the effectiveness of the deterrent signal and can selectively cause the deterrent signal generator to output another the deterrent signal differing from the deterrent signal first generated by the deterrent signal generator;
   wherein the sensor includes a sound transducer to detect sound caused by the animal.

5. A system to deter an animal from remaining in an area, comprising:
   at least one sensor assembly adapted to sense vibration in the area caused by an animal, including:
      a first container holding at least one BB object within;
      a second container disposed at an angle relative to the first container, holding at least one BB object within; and
      a sound transducer disposed to detect motion of the BB object in either the first or second container;
   a deterrent signal generator to receive an output from the sensor assembly, the deterrent signal generator capable of storing at least one deterrent signal selected from a group consisting of (i) a message recorded in a human voice admonishing said animal, and (ii) a sound likely to startle said animal; and
   a deterrent signal output transducer to receive an output from the deterrent signal generator to generate the deterrent signal.

6. A system to deter an animal from remaining in an area, comprising:
   at least one sensor assembly adapted for sensing vibration in the area caused by the animal, including:
      a first electrical conductor having connected therewith at least one loop of electrically conductive material; and
      a second electrical conductor disposed to pass through the loop, having a weight attached to one end such that a vibration of the sensor assembly produces at least intermittent electrical contact between the first electrical conductor and the second electrical conductor;
   a deterrent signal generator to receive an output from the sensor assembly, the deterrent signal generator capable of storing at least one deterrent signal selected from a group consisting of (i) a message recorded in a human voice admonishing said animal, and (ii) a sound likely to startle said animal; and
   a deterrent signal output transducer to receive an output from the deterrent signal generator to generate the deterrent signal.

7. A system to deter an animal from remaining in an area, comprising:
   at least one sensor assembly adapted for sensing vibration in the area caused by the animal, including:
      a container holding at least one BB object within, and
      a sound transducer disposed to detect motion of the BB object in the container;
   a deterrent signal generator to receive an output from the sensor assembly, the deterrent signal generator capable of storing at least one deterrent signal selected from a group consisting of (i) a message recorded in a human voice admonishing said animal, and (ii) a sound likely to startle said animal; and
   a deterrent signal output transducer to receive an output from the deterrent signal generator to generate the deterrent signal.

8. The system of claim 7, wherein the container is a sphere.

9. The system of claim 7, wherein the container is a cylinder.

10. A system to deter an animal from entering or remaining in an area, comprising:
    at least one sensor adapted to be placed in the area for sensing the animal;
    a signal generator to receive an output from the at least one sensor, wherein the signal generator is capable of storing at least one deterrent signal including a pulse signal;
    a transducer to receive a deterrent signal from the signal generator to generate a deterrent; and
    a circuit having an input coupled with the at least one sensor and having an output coupled with the signal generator, wherein the circuit can detect the effectiveness of a first deterrent generated from a first deterrent signal and can selectively cause the signal generator to output a second deterrent signal differing from the first deterrent signal;
    wherein the pulse signal stored by the signal generator causes the transducer to emit a burst of light to startle the animal.

11. A system to deter an animal from entering or remaining in an area, comprising:
    at least one sensor adapted to be placed in the area for sensing the animal, wherein the at least one sensor detects infrared emitted by the animal;
    a signal generator to receive an output from the at least one sensor, wherein the signal generator is capable of storing at least one deterrent signal for output selected from a group consisting of (i) a message recorded in a human voice admonishing the animal, and (ii) a sound likely to startle the animal;
    a transducer to receive a deterrent signal from the signal generator to generate a deterrent; and
    a circuit having an input coupled with the at least one sensor and having an output coupled to the signal generator, wherein the circuit can detect the effectiveness of a first deterrent generated from a first deterrent signal and can selectively cause the signal generator to output a second deterrent signal differing from the first deterrent signal.

12. A system to deter an animal from entering or remaining in an area, comprising:
- at least one sensor adapted to be placed in the area for sensing the animal, wherein the at least one sensor includes a sound transducer to detect sounds caused by the animal;
- a signal generator to receive an output from the at least one sensor, wherein the signal generator is capable of storing at least one deterrent signal for output selected from a group consisting of (i) a message recorded in a human voice admonishing the animal, and (ii) a sound likely to startle the animal;
- a transducer to receive a deterrent signal from the signal generator to generate a deterrent; and
- a circuit having an input coupled with the at least one sensor and having an output coupled to the signal generator, wherein the circuit can detect the effectiveness of a first deterrent generated from a first deterrent signal and can selectively cause the signal generator to output a second deterrent signal differing from the first deterrent signal.

* * * * *

UNITED STATES PATENT AND TRADEMARK OFFICE
CERTIFICATE OF CORRECTION

PATENT NO.     : 6,615,770 B2                                           Page 1 of 1
DATED          : September 9, 2003
INVENTOR(S)    : Patterson et al.

It is certified that error appears in the above-identified patent and that said Letters Patent is hereby corrected as shown below:

<u>Title page,</u>
Item [*] Notice, replace "0 days" with -- 45 days --

<u>Column 2,</u>
Line 52, "17 k KHz", replace with -- 17 KHz --

Signed and Sealed this

Twentieth Day of January, 2004

JON W. DUDAS
*Acting Director of the United States Patent and Trademark Office*